(12) United States Patent
Bogart

(10) Patent No.: US 7,343,755 B2
(45) Date of Patent: Mar. 18, 2008

(54) GAS-DRYING SYSTEM

(75) Inventor: James E. Bogart, Glen Rock, PA (US)

(73) Assignee: Flatplate, Inc., York, PA (US)

( * ) Notice: Subject to any disclaimer, the term of this patent is extended or adjusted under 35 U.S.C. 154(b) by 260 days.

(21) Appl. No.: 11/325,007

(22) Filed: Jan. 4, 2006

(65) Prior Publication Data

US 2007/0151276 A1    Jul. 5, 2007

(51) Int. Cl.
F25D 21/14    (2006.01)

(52) U.S. Cl. .......................................... 62/285; 62/291

(58) Field of Classification Search .................. 62/92, 62/93, 95, 96, 272, 285, 291; 95/244; 165/113, 165/166

See application file for complete search history.

(56) References Cited

U.S. PATENT DOCUMENTS

| | | | |
|---|---|---|---|
| 2,093,805 A * | 9/1937 | De Baufre ..................... | 62/94 |
| 2,475,255 A | 7/1949 | Rollman | |
| 2,802,349 A * | 8/1957 | Skaperdas .................... | 62/646 |
| 3,093,468 A | 6/1963 | Zankey | |
| 3,210,950 A * | 10/1965 | Lady ........................... | 62/645 |
| 3,230,689 A | 1/1966 | Hussman | |
| 3,409,693 A * | 11/1968 | McHarg ..................... | 585/259 |
| 3,430,693 A | 3/1969 | Egenvall | |
| 3,464,184 A | 9/1969 | Wright | |
| 3,464,186 A * | 9/1969 | Walker et al. ................. | 96/115 |
| 3,614,872 A * | 10/1971 | Joseph et al. ................. | 62/54.2 |
| 3,635,038 A | 1/1972 | Nagel et al. | |
| 3,787,559 A | 1/1974 | Rudolph et al. | |
| 3,824,767 A | 7/1974 | Ford | |
| 3,957,656 A | 5/1976 | Castelli | |
| 4,182,411 A * | 1/1980 | Sumitomo et al. .......... | 165/110 |
| 4,339,883 A * | 7/1982 | Waldmann ................... | 34/469 |
| 4,674,446 A | 6/1987 | Padilla, Sr. | |
| 4,999,037 A | 3/1991 | Albritton et al. | |
| 5,117,563 A * | 6/1992 | Castonguay ................... | 34/86 |
| 5,664,426 A * | 9/1997 | Lu ................................. | 62/93 |
| 5,727,623 A | 3/1998 | Yoshioka et al. | |
| 5,845,505 A | 12/1998 | Galus et al. | |
| 6,171,374 B1 | 1/2001 | Barton et al. | |

(Continued)

FOREIGN PATENT DOCUMENTS

DE    20315267 U1    3/2004

(Continued)

Primary Examiner—Mohammad M. Ali
(74) Attorney, Agent, or Firm—McNees Wallace & Nurick LLC

(57) ABSTRACT

An apparatus and method for a gas drying system includes a recuperator section having first and second fluid flow paths wherein fluid flowing through the first fluid flow path is in thermal communication with fluid flowing through the second fluid flow path. A refrigerated section having a third fluid flow path is in fluid communication with the first fluid flow path for further cooling the flowing fluid to about a dew point temperature. A moisture separator section is disposed between the recuperator and refrigerated sections, the assembled sections forming an integral construction, wherein the separator is in planar contact with the recuperator and refrigerated sections. The separator has a fourth fluid flow path in fluid communication with the third fluid flow path and the second fluid flow path for removing condensed and entrained liquid from a stream of flowing fluid prior to fluid flowing into the second fluid flow path.

20 Claims, 6 Drawing Sheets

U.S. PATENT DOCUMENTS

| | | | |
|---|---|---|---|
| 6,375,718 B1 * | 4/2002 | Blangetti et al. | 95/244 |
| 6,387,161 B1 | 5/2002 | Zhou et al. | |
| 6,719,832 B2 | 4/2004 | Edlund et al. | |
| 6,810,835 B2 | 11/2004 | Ishiguro et al. | |
| 6,843,836 B2 * | 1/2005 | Kitchener | 96/234 |
| 6,875,247 B2 | 4/2005 | TeGrotenhuis et al. | |
| 2005/0284505 A1 | 12/2005 | Bang | |

FOREIGN PATENT DOCUMENTS

| | | | |
|---|---|---|---|
| EP | 1616610 A | | 1/2006 |
| JP | 11-279649 A | * | 10/1999 |
| WO | 2007043078 A1 | | 4/2007 |

* cited by examiner

GAS-DRYING SYSTEM

FIELD OF THE INVENTION

The present invention is directed to a gas dryer construction, and more particularly, the present invention is directed to an integral plate-type gas dryer construction.

BACKGROUND OF THE INVENTION

Gas-drying systems are used to remove moisture from gases, such as air, methane, and carbon dioxide. Moisture removal is typically achieved either by passing the moist gas through a desiccant or by flowing it over a heat exchanger surface that is maintained at a lower temperature than the flowed gas. Heat exchanger type gas dryers are typically much more compact than desiccant types gas dryers, and primarily for that reason, are more prevalent in the industry. Moreover, heat exchanger type gas dryers utilizing stacked plates provide yet further reductions in the size of the heat exchanger.

Typically, gas dryer heat exchangers utilize either a low temperature refrigerant, produced by a mechanical refrigeration cycle, or a low temperature fluid, such as water, to provide the cooling. The hot, moist gas is cooled to its dew point, which is the temperature at which vapor from the gas will condense on the heat exchanger surfaces, forming a liquid on the heat exchanger surfaces. At this point, the gas is in a thermodynamically saturated state. As the gas is further cooled, additional vapor is removed, although the gas remains saturated. Thus, the gas exiting the heat exchanger contains an amount of vapor, but has a reduced mass ratio of water-to-gas.

Saturated gas, whether at elevated or reduced temperature, is typically unsuitable for many industrial applications. Therefore, many industrial application systems incorporate a secondary heat exchanger to re-heat the existing reduced temperature, moist gas above its dew point and thereby provide a non-saturated gas to the industrial application system with significantly reduced moisture content. In many cases, the heated, moist gas flowing to the reduced temperature heat exchanger is used as the heat source for the re-heat process. For this application, the re-heat exchanger is known as a recuperator because thermal energy is removed from a gas stream entering the reduced temperature heat exchanger, the thermal energy being simultaneously recovered by a gas stream exiting the reduced temperature heat exchanger. Thus the recuperator increases the system efficiency by reducing the amount of cooling required to be accomplished in the reduced temperature heat exchanger. Manufacturers of brazed-plate type heat exchangers generally combine the reduced temperature exchanger and recuperator into a single assembly. The integral assembly is typically referred to as either an "integrated gas dryer" or a "recuperated gas dryer."

A considerable amount of moisture is condensed from the gas while it flows through the reduced temperature exchanger. This moisture must be captured and removed prior to the gas entering the recuperator to prevent it from re-evaporating and thereby increasing the moisture level in the gas as the gas is heated. This moisture removal is accomplished through the use of a device known as a moisture separator.

Previous methods to accomplish this gas-drying include:
two separate heat exchangers and an external moisture separator;
one integral heat exchanger with an external moisture separator; and
one integral heat exchanger with an integral, external moisture separator.

A basic flowpath of a gas through a heat exchanger/separator system is described for the two separate heat exchangers (recuperator and refrigerated dryer) with an external moisture separator design as shown in FIG. 1:

1) Heated, moist gas enters the recuperator at Point 1.
2) The heated gas flows through one portion of the recuperator (from Point 1 to Point 2) and is pre-cooled by gas flowing through another portion of the recuperator (from Point 7 to Point 8). The gas exits the recuperator at Point 2.
3) The gas then flows through external piping and enters the refrigerated dryer (reduced temperature heat exchanger) at Point 3.
4) The gas flows through the refrigerated dryer (from Point 3 to Point 4) wherein the gas is cooled to its dew point by a cooling fluid flowing through the refrigerated dryer between an inlet and an outlet.
5) The gas then exits the Refrigerated Dryer at Point 4 as a combination of cool, moist saturated gas and liquid water and flows through a conduit to an inlet of an external separator at Point 5.
6) The gas and liquid flow from Point 5 to Point 6 through the separator, which captures and separates the condensed liquid from the gas.
7) The gas then exits the external separator at Point 6 and flows through another conduit to the cold side of the recuperator at Point 7.
8) The gas then flows through the cold side of the recuperator from Point 7 to Point 8 wherein the gas is heated to a temperature greater than the dew point by the incoming heated gas (flowing from Point 1 to Point 2).
9) The gas exits the recuperator at Point 8 as a dried gas.

An improvement to this method is to combine the two separate heat exchangers (recuperator and refrigerated dryer) into one integral heat exchanger with an external moisture separator. This combined heat exchanger reduces the manufacturing cost by eliminating one run of conduit between the heat exchangers, provides an increasingly compact heat exchanger construction, and increases system efficiency by eliminating the thermal energy loss formerly associated with transporting the gas through the conduit between the heat exchangers. A system schematic is shown in FIG. 2 and functions substantially similar as previously described for FIG. 1.

A further improvement to the previously described systems incorporates an integral, external moisture separator secured to one face of an integrated gas dryer assembly, i.e., recuperator and refrigerated dryer. As shown in FIG. 3, the separator section is secured to one face of the refrigerated dryer section. By making the separator section integral with either the recuperator or the refrigerated dryer section, the conduit is eliminated in steps 5) and 7) as previously discussed with regard to FIG. 1.

However, there are several significant drawbacks associated with this integral construction. First, to create the entire integrated unit, specially configured stamped plates are required for the heat exchanger sections. That is, single plates must each extend to encompass both the recuperator and refrigerated dryer sections, which plates are sized differently than the plates that comprise the separator section. Second, the design construction requires several differently sized stamped plates to cover a typical performance range of industrial interest. Third, the "footprint" size of the integral construction cannot be adjusted to optimize the customer's system package size and cost because the recuperator and refrigerated dryer sections must have the same number of plates, respectively. Fourth, a further disadvantage resulting from the recuperator and refrigerated dryer sections having the same number of plates is that the refrigerated dryer section cannot be changed or independently adjusted, which greatly restricts the range of application and performance of the device. Fifth, the integral construction design has significantly lowered pressure-bearing capabilities because the separator section is attached, and therefore only supported on one side by the recuperator or refrigerated dryer section. Sixth, the integral construction, as well as the construction as shown in FIG. 2, both suffer from a lower thermal efficiency caused by the recuperator section being directly coupled to the refrigerated dryer section. Due to this direct contact, thermal energy is transferred by virtue of conduction directly through the heat exchanger plates from one section to the next. In other words, since the recuperator section operates at a higher average temperature than the refrigerated dryer section, heat is transferred from the recuperator to the refrigerated dryer section, which increases the thermal load required from the refrigeration system, and reduces the re-heat temperature of the dry gas that exits the recuperator.

What is needed is an integral gas dryer construction that does not have the drawbacks as discussed above.

SUMMARY OF THE INVENTION

The present invention relates to a gas drying system including a recuperator section having a first fluid flow path and a second fluid flow path to enable fluid flow so that fluid flowing through the first fluid flow path is in thermal communication with the fluid flowing through the second fluid flow path. Heat is transferred from the fluid flowing in the first fluid flow path to the fluid flowing in the second fluid flow path. A refrigerated section has a third fluid flow path in fluid communication with the first fluid flow path for further cooling the flowing fluid to about a dew point temperature. A moisture separator section is disposed between the recuperator and refrigerated sections, the assembled recuperator, separator and refrigerated sections forming an integral construction, wherein the separator being in planar contact with the recuperator and refrigerated sections. The separator has a fourth fluid flow path in fluid communication with the third fluid flow path and the second fluid flow path for removing condensed and entrained liquid from a stream of flowing fluid prior to fluid flowing into the second fluid flow path.

The present invention still further relates to a method of constructing a gas drying system. The steps include providing a recuperator section having a first fluid flow path and a second fluid flow path to enable fluid flow so that fluid flowing through the first fluid flow path is in thermal communication with the fluid flowing through the second fluid flow path, heat being transferred from the fluid flowing in the first fluid flow path to the fluid flowing in the second fluid flow path. The method further providing a refrigerated section having a third fluid flow path in fluid communication with the first fluid flow path for cooling flowing fluid to about a dew point temperature. The method further includes inserting a moisture separator section disposed between the recuperator and refrigerated sections, the assembled recuperator, separator and refrigerated sections forming an integral construction, wherein the separator being in planar contact with the recuperator and refrigerated sections, the separator having a fourth fluid flow path in fluid communication with the third fluid flow path and the second fluid flow path for removing condensed and entrained liquid from a stream of flowing fluid prior to fluid flowing into the second fluid flow path.

The present invention still yet further relates to a gas drying system including a recuperator section having a plurality of stamped plates having a first fluid flow path and a second fluid flow path to enable fluid flow so that fluid flowing through the first fluid flow path is in thermal communication with the fluid flowing through the second fluid flow path. Heat is transferred from the fluid flowing in the first fluid flow path to the fluid flowing in the second fluid flow path. A refrigerated section includes a plurality of stamped plates having a third fluid flow path in fluid communication with the first fluid flow path for further cooling the flowing fluid to about a dew point temperature. A moisture separator section is disposed between the recuperator and refrigerated sections. The assembled recuperator, separator and refrigerated sections form an integral construction, wherein the separator being in planar contact with the recuperator and refrigerated sections. The separator has a fourth fluid flow path in fluid communication with the third fluid flow path and the second fluid flow path for removing condensed and entrained liquid from a stream of flowing fluid prior to fluid flowing into the second fluid flow path.

An advantage of the present invention is that it eliminates external plumbing between the separator and the heat exchanger sections.

Another advantage of the present invention is that conduction between the recuperator and refrigerated sections is substantially reduced.

A further advantage of the present invention is that the number of heat exchanger plates for the recuperator and refrigerated sections can differ with respect to each other.

A yet further advantage of the present invention is that it can withstand elevated fluid pressure levels.

A still yet further advantage of the present invention is that it has fewer different parts.

Other features and advantages of the present invention will be apparent from the following more detailed description of the preferred embodiment, taken in conjunction with the accompanying drawings which illustrate, by way of example, the principles of the invention. Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 4:
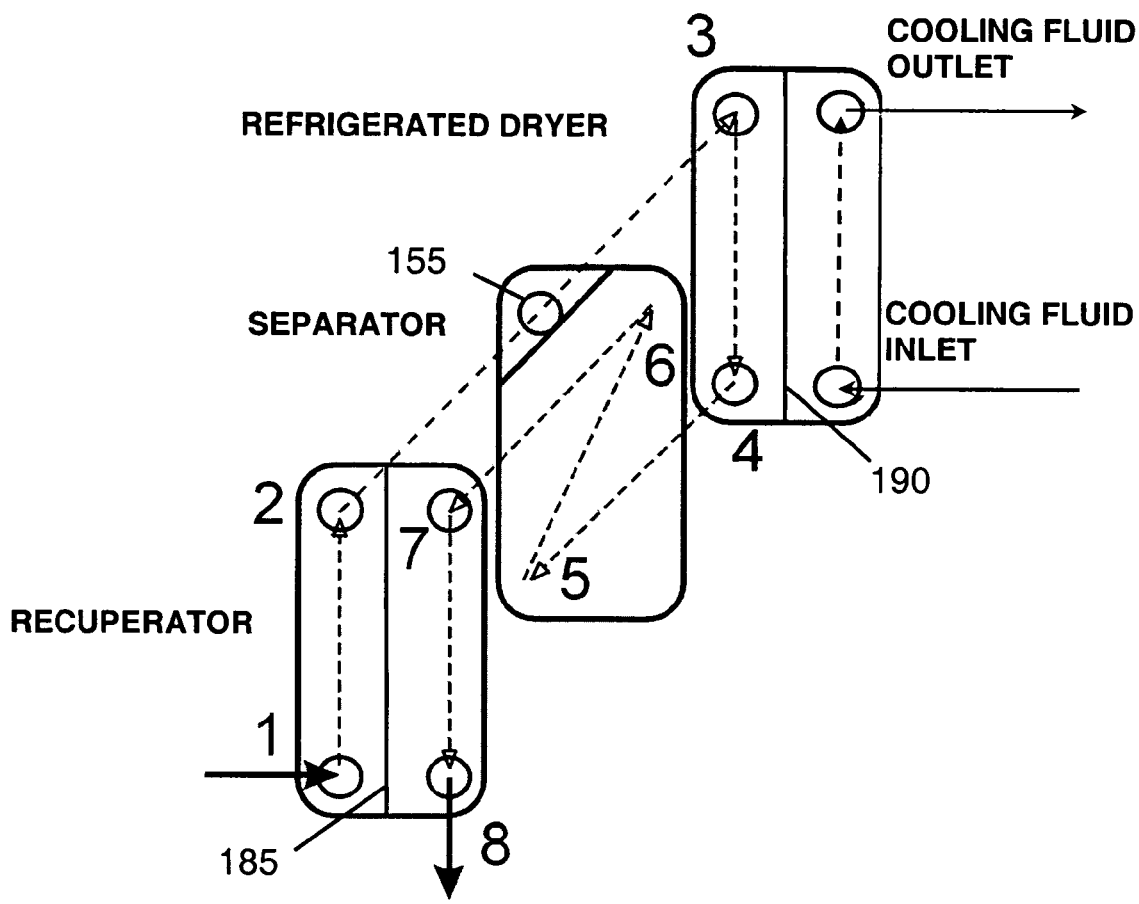
FIG. 4 is a schematic of a gas dryer construction of the present invention.
Figure 5:
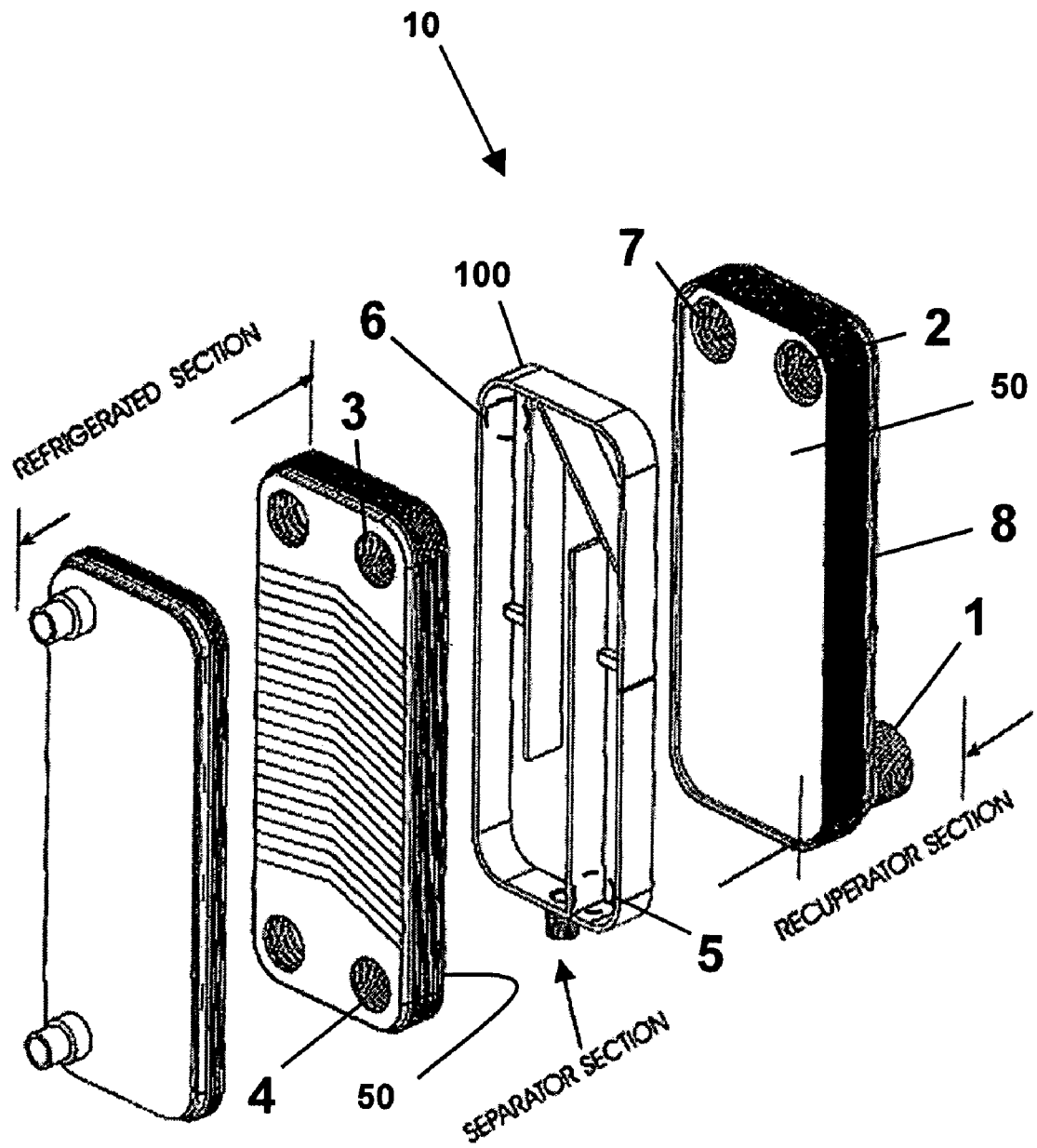
FIG. 5 is an exploded perspective view of a gas dryer construction of the present invention.

One embodiment of a gas dryer 10 of the present invention is depicted in FIG. 5. As shown schematically in FIG. 4, a gas to be dried or non-processed gas enters Port 1 of a recuperator section or recuperator and flows from Port 1 to Port 2 along a fluid flow path formed in the recuperator that is not in fluid communication, but in thermal communication via a conductive barrier 185 with a second fluid flow path defined between Ports 7 and 8. Upon flowing past Port 2, the gas flows through a partitioned opening 155 formed in a moisture separator section or separator. After flowing through the separator, the gas enters Port 3 of a refrigerated dryer section or refrigerated dryer and flows from Port 3 to Port 4 along a fluid flow path formed in the refrigerated dryer that is not in fluid communication, but in thermal communication via a conductive barrier 190 with a second fluid flow path through which a separate cooling fluid is circulated. The cooling fluid cools the gas to about the dew point temperature of the gas, which is the temperature at which vapor from the gas will condense on the heat exchanger surfaces, forming a liquid on the heat exchanger surfaces. At this point, the gas is combination of cool, moist saturated gas and liquid water.

Once the gas flows past Port 4 and exits the refrigerated dryer, the gas flows from Port 5 to Port 6 of the separator which captures and separates the condensed liquid from the gas. After flowing through the separator, the cooled gas flows through the second fluid flow path that extends between Port 7 to Port 8 in the recuperator. The cooled gas flowing through the second fluid flow path is in thermal communication with warmer gas flowing through the first fluid flow path of the recuperator. This thermal communication warms the gas in the second fluid flow path to a temperature that is greater than the dew point of the gas, thus the reducing the mass ratio of water-to-gas. In other words, a dried gas exits the recuperator at Point 8 for use in a system. Simultaneously, the non-processed gas flowing through the first fluid flow path of the recuperator is cooled by the gas flowing through the second fluid flow path of the recuperator, lowering the temperature of the gas flowing through the first fluid flow path, so that a reduced cooling load is required by the refrigerated dryer.

Although a number of heat exchanger constructions can be used, preferably, each of the recuperator and refrigerated dryer sections make use of stamped plates that are stacked together such as disclosed in Applicant's invention Ser. No. 10/643,689, filed Aug. 19, 2003 and entitled PLATE HEAT EXCHANGER WITH ENHANCED SURFACE FEATURES assigned to assignee of the present invention which is hereby incorporated by reference in its entirety.

It is to be understood that the conductive barrier 185, 190 as schematically shown in FIG. 4 are only indicative of a physical separation between the fluids flowing through the separate fluid flow paths in each of the respective recuperator and refrigerated dryer. That is, the respective fluid flow paths of the fluids flowing through the recuperator and refrigerated dryer sections are not constrained by respective physical barriers (i.e., conductive barriers 185, 190) that bifurcate each of the recuperator and refrigerated dryer sections. The conductive barriers 185, 190 ensure that no physical mixing of the fluids occur, as discussed in Applicant's above-mentioned invention Ser. No. 10/643,689.

It is to be understood that the recuperator, separator and refrigerated dryer sections are preferably assembled together in-line with each other, that is, as parallel plates or devices, comprising an integral unit. Preferably, plates used in the recuperator section are interchangeable with the plates used in the refrigerated section, so that fewer parts are required to construct the gas dryer unit. Further, since the plates in the recuperator and refrigerated dryer sections are individually separated from each other, the number of plates used in the recuperator section can be different than the number of plates used in the refrigerated section. This flexibility in construction provides additional opportunity to improve system efficiency and is adaptable for a customer's unique space/performance requirements.

Figure 1:
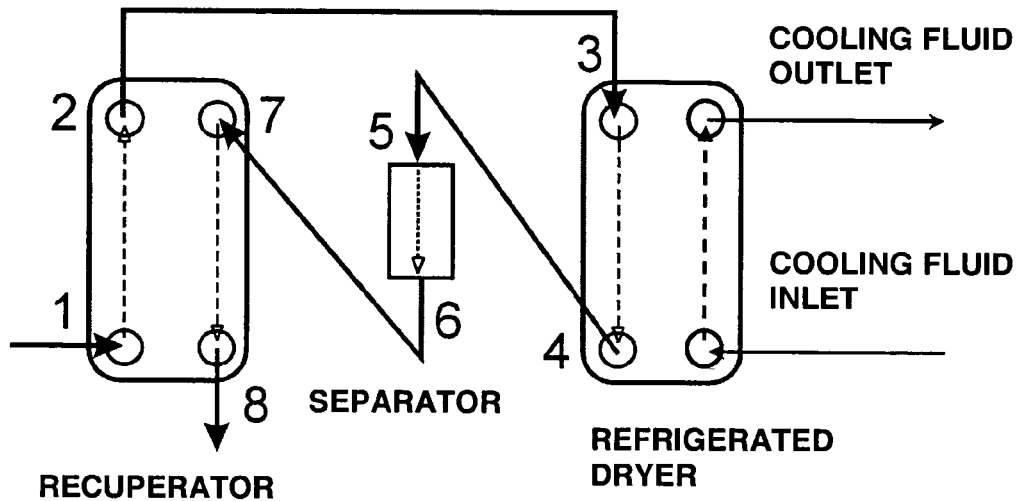
FIGS. 1-3 are schematics of known art gas dryer constructions.
Figure 2:
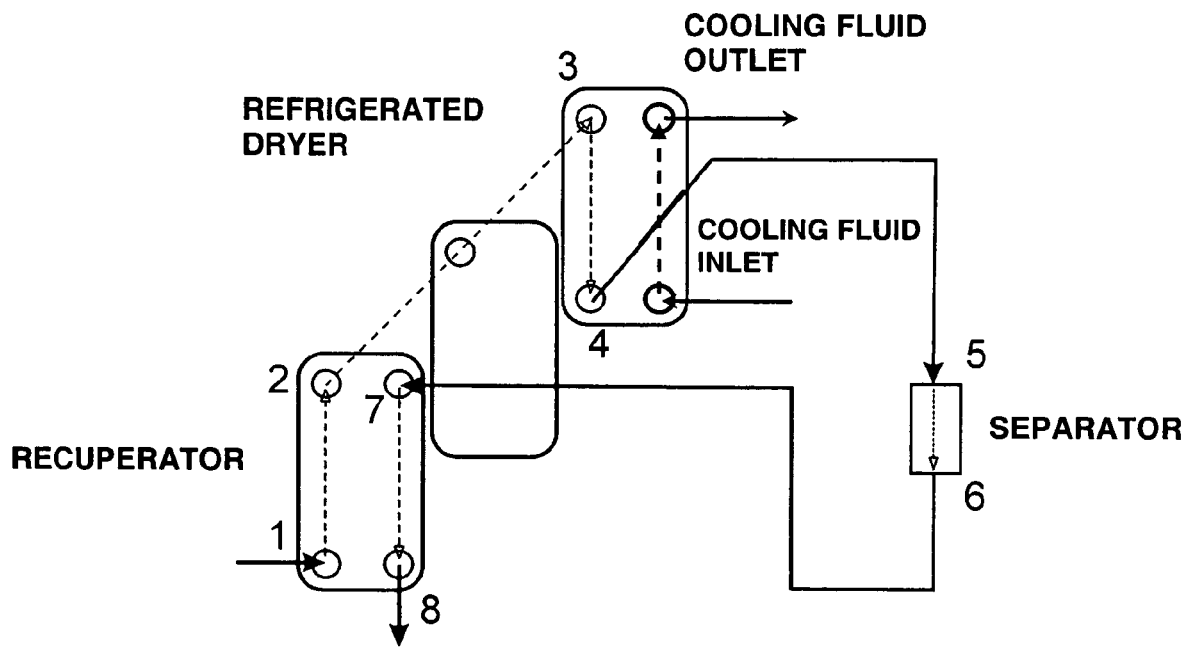
Figure 3:
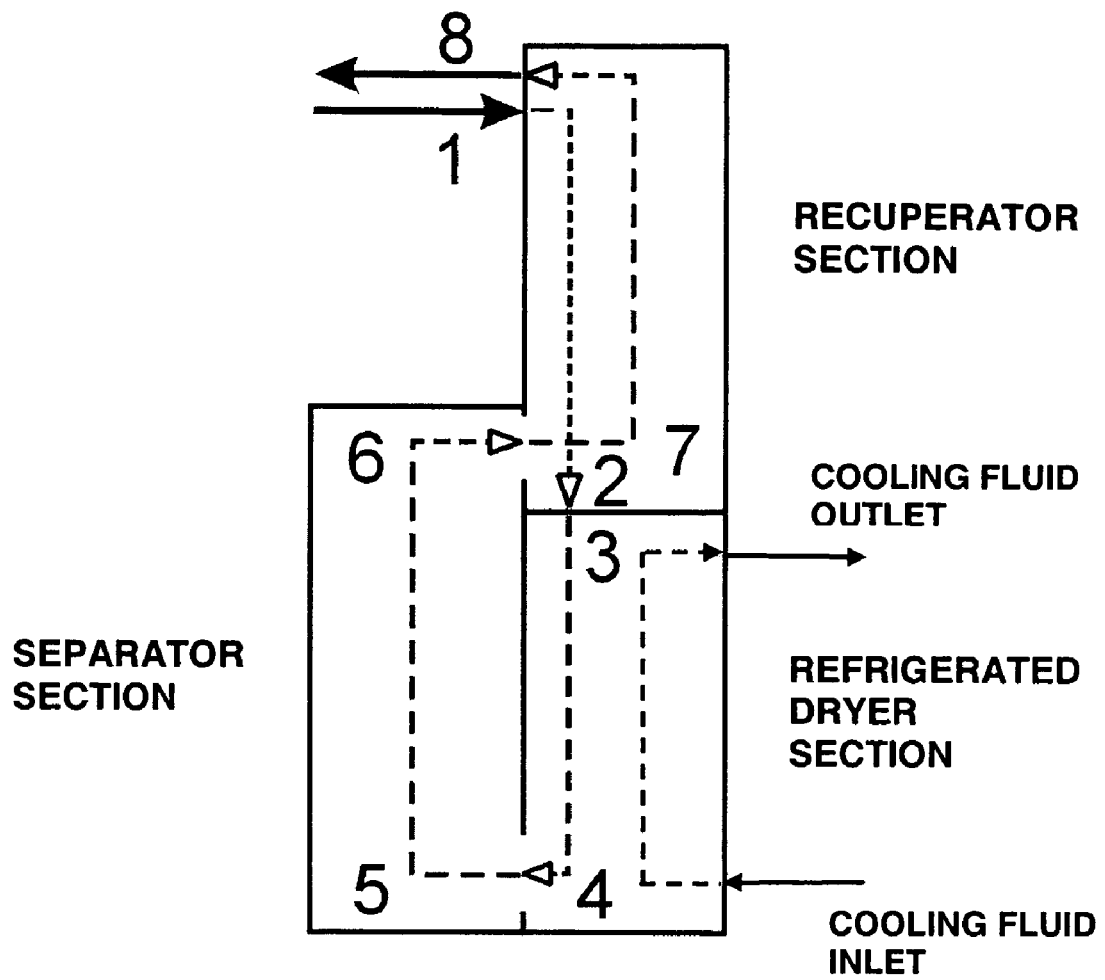
Figure 6:
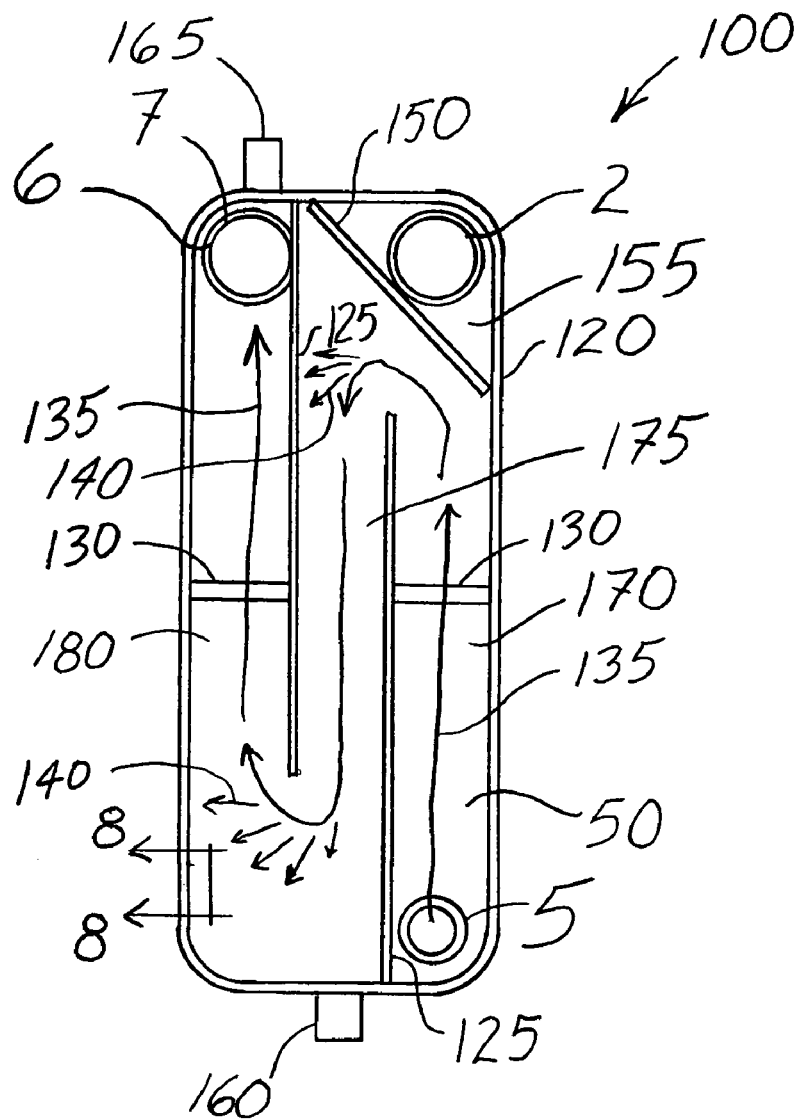
FIG. 6 is a perspective view of a separator of the present invention.

As shown in FIGS. 5-6, gas dryer 10 shows a preferred embodiment of the separator, which is identified as element number 100. Separator 100 includes a frame 120 that is disposed between opposed backing plates 50 of respective recuperator and refrigerated dryer sections. By virtue of being secured between the backing plates 50, the operating pressure of the separator 100 can be significantly increased over previous constructions, e.g., FIG. 3. Moreover, since the backing plates 50 have reduced thermal energy transfer rates, due at least in part to their increased thickness and non-enhanced surfaces as compared to the plates used to construct the recuperator and refrigerated sections, there is a significantly reduced thermal energy loss between the separator section and either the refrigerated section or the recuperator section of the gas dryer 10. Moreover, coating layers composed of polymers or other suitable substances can be applied to the internal surfaces of the separator 100, which includes backing plates 50. Preferably the coating layers are applied after assembly of the gas dryer unit 10, to provide improved insulating qualities between the adjacent sections and between the partitioned flow in the separator 100.

As further shown in FIG. 6, each of a pair of substantially parallel guides 125 is disposed against opposite ends of the frame 120 of separator 100. To better secure guides 125 in position, spacers 130 can be disposed between opposite sides of the frame 120 and the guides 125. A partition 150, preferably a straight portion of material for ease of assembly is disposed in at least one corner of the separator 100. Partition 150 separates flow of gas between Point 2 of the recuperator and Point 3 of the refrigerated dryer from flow of gas occurring on the other side of partition 150. An opening 155 defined by partition 150 and the frame 120 provides the fluid connection between Point 2 of the recuperator and Point 3 of the refrigerated dryer. Due at least in part to the increased thickness of the partition 150 as well as the relatively short length of the partition 150 and small volume of the chamber defined by the partition 150 and the frame 120 as compared to the volume of the separator, there is little thermal energy loss between the two fluid flows. Moreover, as previously discussed, added coatings can further reduce this thermal loss.

Figure 8:
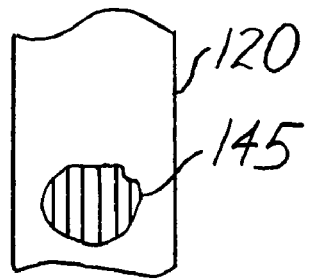
FIG. 8 is a view taken along line 8-8 of FIG. 6 of an embodiment of a separator of the present invention.

Gas flow 135 through separator 100, that is in a plane perpendicular to the gas flow through opening 155, enters the separator 100 through Port 5, which is received from Port 4 of the refrigerated dryer. The gas flow 135, which has been cooled to its dew point temperature, is saturated with moisture, and can also include an amount of liquid entrained in the flow stream. The flow stream of gas 135 passing through Port 5 first enters the separator at an angle to the plane containing the plates of the refrigerated section, preferably 90°, and collides with backing plate 50 that is disposed between the separator and recuperator. The flow stream of gas 135 then is turned so that the flow is substantially parallel to the plane which includes the separator and directed upward along a passageway 170 defined by guide 125, frame 120 and the opposed backing plates 50. That is, the separator, refrigerated dryer and the recuperator, which are each planar, also have a defined thickness that is perpendicular to the plane. As used herein, the term plane includes the device, i.e., the separator, recuperator or refrigerated dryer, and is not used as an infinitesimally thin plate in the traditional geometric sense or usage. Upon the gas 135 colliding with the backing plate 50, moisture entrained in the gas flow stream coalesces into larger droplets. Optionally, at least a portion of the interior surfaces of the separator 100 includes a surface treatment 145 (FIG. 8), preferably formed in any combination of the frame 120, partition 150 and guide 125 which can include any features, such as grooves formed in the separator interior surfaces by forming methods, including, but not limited to machining, chemical etching, deposition or other methods, such as disclosed in Applicant's invention Ser. No. 10/643,689. It is to be understood that surface treatment 145 can also be included on the surfaces of backing plates 50 if the surface treatment 145 does not significantly raise the amount of thermal heat transfer through the backing plates 50, such as, for example, by an insulative coating. The surface features of surface treatment 145 enhance coalescing of droplets, and can additionally help draw coalesced liquid toward a drain 160 disposed at the lower portion of the separator 160. In one embodiment, surface treatment 145 includes vertically directed grooves that draw coalesced liquid toward drain 160 via capillary action. Preferably, separator 100 is disposed substantially vertically so that partition 150 is adjacent the upper end of the separator 100. However, even if the separator 100 is not disposed substantially vertically, any surface treatment 145 is preferably applied as to enhance the drawing of coalesced liquid substantially vertically toward the drain 160 for removal from the system.

Additionally, or in combination with other surface treatments 145, mesh material or other material that increases surface area (not shown) or a forming method that punches or dimples the surfaces can be applied/formed to any portion of the interior surface of the separator to additionally draw or capture moisture from the flowing gas. The extent of surface treatments 145 are limited only by the allowable pressure drop restriction allowed by the application.

Once the gas traveling upward through passageway 170 reaches partition 150, the gas flow 135 is again decelerated and turned substantially 180 degrees within the plane of the separator, with additional entrained moisture 140 colliding with partition 150 or guide 125 that is coalesced and collected for removal via drain 160. Gas flow 135 then continues substantially vertically downward along a passageway 175 between opposed guides 125 until yet again being decelerated and turned 180 degrees within the plane of the separator and directed substantially vertically upward along a passageway 180. Passageway 180 is defined by the frame 120 and guide 125 opposite passageway 170. Further entrained moisture 140 is removed from gas stream 135. Upon completion of the tortuous, winding serpentine journey through passageways 170, 175, 180 with the resulting coalesced moisture being removed and directed toward drain 160, gas flow 135 is then directed through Point 6 and then into Point 7 of the recuperator. The dried gas then flows along the fluid flow path from Point 7 to Point 8 of the recuperator and then exits the recuperator, the dried gas being provided for use in a system. While the dried gas flows from Point 7 to Point 8 of the recuperator, incoming gas flowing from Point 1 to Point 2 of the recuperator heats the dried gas by conduction through conductive barrier 185, further lowering the mass ratio of water-to-gas.

Optionally, separator 100 includes a flush port 165 that permits fluid to be introduced into the separator to cleanse or purge the separator. This purging is achieved by adding fluid through flush port 165, which fluid can be removed through the drain 160.

Figure 7:
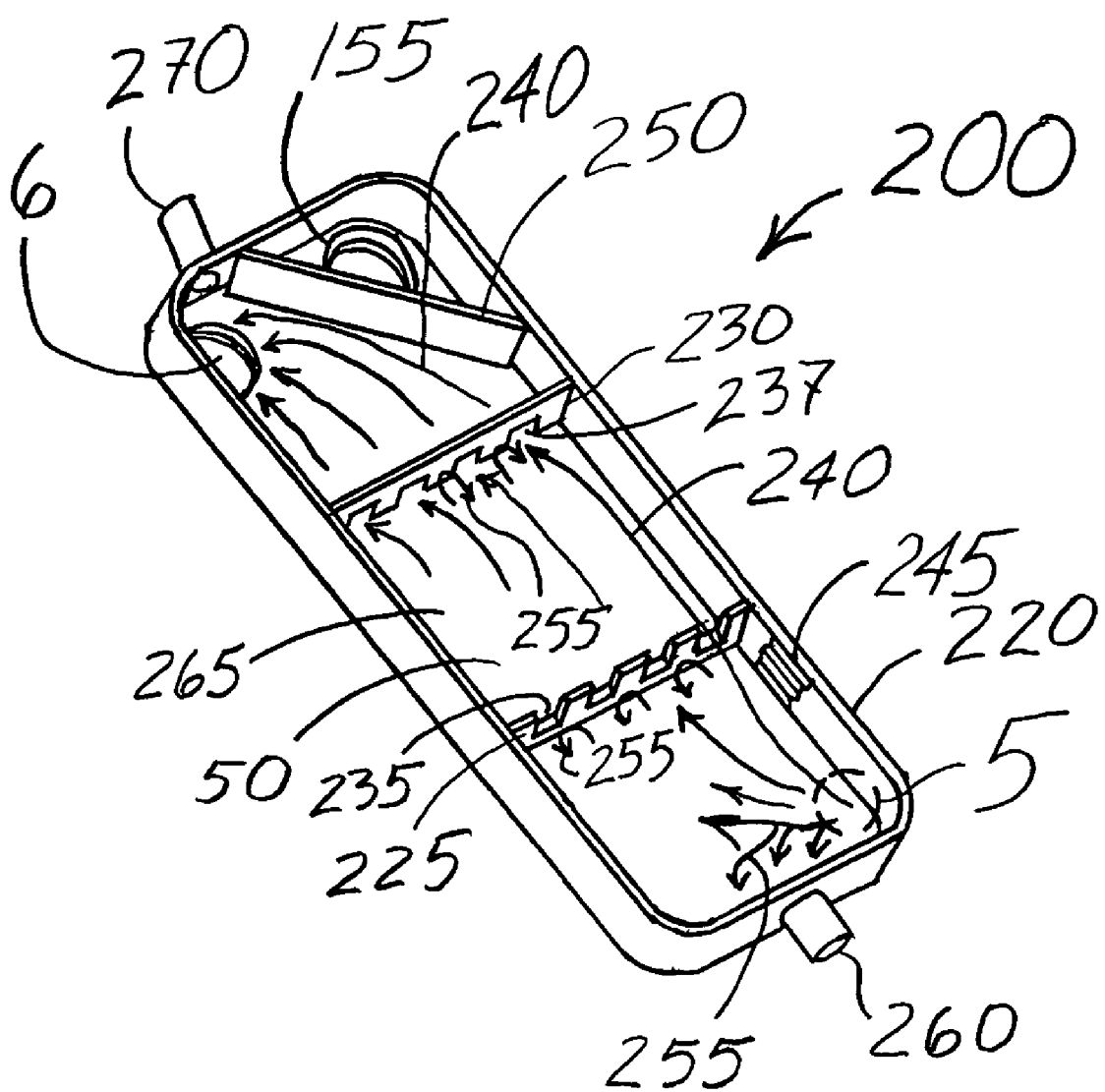
FIG. 7 is a perspective view of an alternate embodiment of a separator of the present invention.

FIG. 7 shows an alternate separator construction 200 in a perspective view to better view the features of the refrigerated dryer, versus the preferred substantially vertical positioning of the refrigerated dryer, and does not show the backing plate 50 on the refrigerated dryer for clarity. Separator 200 includes a frame 220 that is also disposed between the backing plates 50 of the recuperator and refrigerated dryer sections. Extending substantially perpendicular to the opposite sides of the frame 220 are baffle plates or baffles 225, 230. As shown, each baffle 225, 230 includes a plurality of castellated openings 235, 237 preferably disposed along one edge of the baffle, and more preferably, the openings 235, 237 are disposed on opposite edges of each baffle 225, 230 so that the openings 235, 237 are offset from each other. That is, as shown, baffle 225 openings 235 open toward the refrigerated dryer, and baffle 230 openings 237 open away from the refrigerator dryer. Also, the openings 235, 237 can also be laterally offset from each other. Similar to separator 100, the interior surfaces of separator 200 can include surface treatments 245 that are similar to surface treatments 145 as previously discussed.

In operation, cool, moist gas leaving Point 4 of the refrigerated dryer at about dew point temperature enters Point 5 of separator 200, the gas flow 240 impinging on backing plate 50 secured to the recuperator. Impingement of gas flow 240 removes a significant amount of entrained moisture 255 from the gas flow 240, which entrainment preferably being further enhanced by surface treatment 245, before being directed vertically and accelerated toward baffle 225. The gas flow 240 approaching baffle 225 is accelerated and turned slightly to flow through the restricted flow area of the castellated openings 235 formed in baffle 225. This acceleration and turn cause further moisture 255 to impinge on the surface of baffle 225 that is subsequently removed from the gas stream via drain 260. The gas velocity is then reduced as the gas stream 240 expands into a chamber 265 that is disposed between baffles 225, 230. As the gas stream 240 approaches the baffle 230, the gas stream 240 is once again accelerated and turned slightly to flow through the openings 235 which are opposite of those of the baffle 255. This acceleration and turn cause further moisture 255 to impinge on baffle 230 that is subsequently removed from the gas stream via drain 260. To prevent moisture 255 from accumulating on the baffles 225, 230, the baffles 225, 230 can be sufficiently angled so that the moisture 255 flows from the baffles, and/or weep holes (not shown) can be formed in the baffles. The gas stream 240 then flows through Point 6 and then into Point 7 of the recuperator. The dried gas then flows along the fluid flow path from Point 7 to Point 8 of the recuperator and then exits the recuperator, the dried gas being provided for use in a system application. While the dried gas flows from Point 7 to Point 8 of the recuperator, incoming gas flowing from Point 1 to Point 2 of the recuperator heats the dried gas, further lowering the mass ratio of water-to-gas.

Those having skill in the art will appreciate that the number, size and shape of baffle and baffle openings can vary significantly from the castellated plate openings as shown in FIG. 7, and are limited only by the allowable pressure drop restriction allowed by the application. Similarly, the number of passageways of the serpentine separator construction can be more or less than three, are not necessarily vertically disposed, or even the same width with respect to each other, and are also limited only by the allowable pressure drop restriction allowed by the application.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A gas drying system comprising:
   a recuperator section having a first fluid flow path and a second fluid flow path to enable fluid flow so that fluid flowing through the first fluid flow path is in thermal communication with the fluid flowing through the second fluid flow path, heat being transferred from the fluid flowing in the first fluid flow path to the fluid flowing in the second fluid flow path;
   a refrigerated section having a third fluid flow path in fluid communication with the first fluid flow path for further cooling the flowing fluid to about a dew point temperature; and
   a moisture separator section disposed between the recuperator and refrigerated sections, the assembled recuperator, separator and refrigerated sections forming an integral construction, wherein the separator being in planar contact with the recuperator and refrigerated sections, the separator having a fourth fluid flow path in fluid communication with the third fluid flow path and the second fluid flow path for removing condensed and entrained liquid from a stream of flowing fluid prior to fluid flowing into the second fluid flow path.

2. The gas drying system of claim 1 wherein the recuperator section and the refrigerated section are each comprised of a plurality of formed plates.

3. The gas drying system of claim 2 wherein at least a portion of a plate of the plurality of formed plates has a surface treatment.

4. The gas drying system of claim 3 wherein at least one plate of the plurality of formed plates of the recuperator section and the refrigerated section is interchangeable.

5. The gas drying system of claim 2 wherein the recuperator section and the refrigerated section can have a different number of plates.

6. The gas drying system of claim 1 wherein the recuperator section and the refrigerated section have minimized thermal communication.

7. The gas drying system of claim 1 wherein the recuperator section, the refrigerated section and the separator section are substantially in-line.

8. The gas drying system of claim 1 wherein at least a portion of a surface of a plurality of surfaces of the separator section have a surface treatment.

9. The gas drying system of claim 8 wherein the surface treatment is a mesh.

10. The gas drying system of claim 1 wherein the separator section comprises a plurality of guides.

11. The gas drying system of claim 10 wherein the plurality of guides are substantially vertically disposed.

12. The gas drying system of claim 10 wherein the separator section comprises a partition for separating fluid flowing between the first and third fluid flow paths and fluid flowing between the second and fourth fluid flow paths.

13. The gas drying system of claim 1 wherein the separator section forces fluid to travel in a serpentine path.

14. The gas drying system of claim 1 wherein the separator section comprises a plurality of baffles.

15. The gas drying system of claim 14 wherein each baffle of the plurality of baffles has a plurality of openings.

16. The gas drying system of claim 15 wherein at least one opening of the plurality of openings is castellated.

17. The gas drying system of claim 1 wherein the separator section comprises a flush port.

18. A method of constructing a gas drying system, the steps comprising:
   providing a recuperator section having a first fluid flow path and a second fluid flow path to enable fluid flow so that fluid flowing through the first fluid flow path is in thermal communication with the fluid flowing through the second fluid flow path, heat being transferred from the fluid flowing in the first fluid flow path to the fluid flowing in the second fluid flow path;
   providing a refrigerated section having a third fluid flow path in fluid communication with the first fluid flow path for cooling flowing fluid to about a dew point temperature; and
   inserting a moisture separator section disposed between the recuperator and refrigerated sections, the assembled recuperator, separator and refrigerated sections forming an integral construction, wherein the separator being in planar contact with the recuperator and refrigerated sections, the separator having a fourth fluid flow path in fluid communication with the third fluid flow path and the second fluid flow path for removing condensed and entrained liquid from a stream of flowing fluid prior to fluid flowing into the second fluid flow path.

19. A gas drying system comprising:
   a recuperator section comprising a plurality of stamped plates having a first fluid flow path and a second fluid flow path to enable fluid flow so that fluid flowing through the first fluid flow path is in thermal communication with the fluid flowing through the second fluid flow path, heat being transferred from the fluid flowing in the first fluid flow path to the fluid flowing in the second fluid flow path;
   a refrigerated section comprising a plurality of stamped plates having a third fluid flow path in fluid communication with the first fluid flow path for further cooling the flowing fluid to about a dew point temperature; and
   a moisture separator section disposed between the recuperator and refrigerated sections, the assembled recuperator, separator and refrigerated sections forming an integral construction, wherein the separator being in planar contact with the recuperator and refrigerated sections, the separator having a fourth fluid flow path in fluid communication with the third fluid flow path and the second fluid flow path for removing condensed and entrained liquid from a stream of flowing fluid prior to fluid flowing into the second fluid flow path.

20. The gas drying system of claim 19 wherein at least one plate of the plurality of formed plates of the recuperator section and the refrigerated section is interchangeable.

* * * * *